US012422331B2

(12) United States Patent
Good et al.

(10) Patent No.: US 12,422,331 B2
(45) Date of Patent: Sep. 23, 2025

(54) METHODS AND APPARATUS TO AUTONOMOUSLY DETECT THERMAL ANOMALIES

(71) Applicant: General Electric Company, Schenectady, NY (US)

(72) Inventors: Brandon S. Good, Niskayuna, NY (US); Bijan Chitsaz, Evendale, OH (US); Guanghua Wang, Niskayuna, NY (US); Bernard P. Bewlay, Niskayuna, NY (US); Gyeong Woo Cheon, Niskayuna, NY (US); Alberto Santamaria-Pang, Bellevue, WA (US)

(73) Assignee: General Electric Company, Evandale, OH (US)

( * ) Notice: Subject to any disclaimer, the term of this patent is extended or adjusted under 35 U.S.C. 154(b) by 0 days.

(21) Appl. No.: 18/646,462

(22) Filed: Apr. 25, 2024

(65) Prior Publication Data

US 2024/0369441 A1   Nov. 7, 2024

Related U.S. Application Data

(63) Continuation of application No. 17/538,717, filed on Nov. 30, 2021, now Pat. No. 11,971,329.

(51) Int. Cl.
*G01M 3/38* (2006.01)
*F02C 7/00* (2006.01)
(Continued)

(52) U.S. Cl.
CPC ............... *G01M 3/38* (2013.01); *F02C 7/00* (2013.01); *G01J 5/0003* (2013.01);
(Continued)

(58) Field of Classification Search
CPC ........ H04N 5/33; H04N 23/661; H04N 23/52; H04N 17/002; H04N 23/81; H04N 25/61;
(Continued)

(56) References Cited

U.S. PATENT DOCUMENTS 6,364,524 B1   4/2002   Markham
7,662,091 B2   2/2010   Bagley
(Continued)

FOREIGN PATENT DOCUMENTS

EP   3391137 A1   10/2018

OTHER PUBLICATIONS

United States Patent and Trademark Office, "Notice of Allowance" issued in U.S. Appl. No. 17/538,697 on Dec. 30, 2022 (8 pages).
(Continued)

*Primary Examiner* — Masum Billah
(74) *Attorney, Agent, or Firm* — Hanley, Flight & Zimmerman, LLC

(57) ABSTRACT

Methods, apparatus, systems, and articles of manufacture are disclosed to autonomously detect thermal anomalies. Disclosed examples include an example apparatus to detect engine anomalies comprising: at least one memory; instructions in the apparatus; and processor circuitry to execute the instructions to: control a plurality of infrared cameras to capture a baseline image set, the baseline image set including at least two thermal images; generate emissivity data based on the baseline image set; provide the baseline image set and the emissivity data to an artificial intelligence model, the artificial intelligence model to generate a reconstructed image set; determine a difference between the baseline image set and the reconstructed image set; and in response to the difference exceeding a threshold, generate an alert indicating detection of an engine anomaly.

17 Claims, 12 Drawing Sheets

(51) Int. Cl.
*G01J 5/00* (2022.01)
*G06T 7/00* (2017.01)
*G06T 7/90* (2017.01)
*G08B 21/18* (2006.01)
*H04N 23/90* (2023.01)

(52) U.S. Cl.
CPC .............. *G06T 7/0002* (2013.01); *G06T 7/90* (2017.01); *G08B 21/182* (2013.01); *H04N 23/90* (2023.01); *F05D 2260/80* (2013.01); *G01J 2005/0077* (2013.01); *G06T 2207/10048* (2013.01); *G06T 2207/20084* (2013.01)

(58) Field of Classification Search
CPC .. G01J 2005/0077; G01J 5/0088; G01J 5/042; G01J 5/046; G01J 5/061; G01J 1/0252; G01J 5/049; G01J 5/0014; G01N 25/72
USPC ......................................................... 348/407
See application file for complete search history.

(56) References Cited

U.S. PATENT DOCUMENTS

| | | | |
|---|---|---|---|
| 8,184,151 | B2 | 5/2012 | Zombo |
| 8,439,630 | B2 | 5/2013 | Lemieux |
| 9,015,002 | B2 | 4/2015 | Zombo |
| 9,239,008 | B2 | 1/2016 | Ekanayake |
| 9,706,152 | B2 | 7/2017 | Griffith |
| 10,271,020 | B2 | 4/2019 | Stuart |
| 10,271,080 | B2 | 4/2019 | Warrick |
| 10,473,528 | B2 | 11/2019 | Sakami |
| 10,823,618 | B2 | 11/2020 | Wang |
| 10,830,132 | B2 | 11/2020 | Wang |
| 10,845,253 | B2 | 11/2020 | Wang |
| 11,643,943 | B1 | 5/2023 | Good et al. |
| 2005/0281520 | A1 | 12/2005 | Kehoskie |
| 2007/0107504 | A1 | 5/2007 | Smed |
| 2008/0277586 | A1 | 11/2008 | Cardinale |
| 2012/0281083 | A1 | 11/2012 | Chivers |
| 2014/0102179 | A1 | 4/2014 | Ekanayake |
| 2015/0292976 | A1* | 10/2015 | Xu ................. G01M 3/38 348/82 |
| 2016/0119592 | A1 | 4/2016 | Stuart |
| 2016/0212360 | A1 | 7/2016 | Williams |
| 2016/0227148 | A1 | 8/2016 | Griffith |
| 2017/0234734 | A1 | 8/2017 | Sakami |
| 2018/0195896 | A1 | 7/2018 | Wang |
| 2018/0195906 | A1 | 7/2018 | Wang |
| 2018/0307125 | A1 | 10/2018 | Mori |
| 2019/0226913 | A1* | 7/2019 | Wang ............... G01J 5/605 |
| 2019/0301945 | A1* | 10/2019 | Wang ............. G01M 15/14 |
| 2020/0200692 | A1 | 6/2020 | Wang |
| 2021/0076006 | A1 | 3/2021 | O'Neill |

OTHER PUBLICATIONS

United States Patent and Trademark Office, " Non-Final Office Action," issued in connection with U.S. Appl. No. 17/538,717, mailed on Jun. 21, 2023, 13 pages.

United States Patent and Trademark Office, "Notice of Allowance and Fee(s) Due," issued in connection with U.S. Appl. No. 17/538,717, dated Dec. 27, 2023, 11 pages.

* cited by examiner

METHODS AND APPARATUS TO AUTONOMOUSLY DETECT THERMAL ANOMALIES

RELATED APPLICATIONS

This patent arises from a continuation of U.S. patent application Ser. No. 17/538,717, now U.S. Pat. No. 11,971,329, filed on Nov. 30, 2021. U.S. patent application Ser. No. 17/538,717 is hereby incorporated herein by reference in its entirety.

FIELD OF THE DISCLOSURE

This disclosure relates generally to anomaly detection and, more particularly, to methods and apparatus to autonomously detect thermal anomalies.

BACKGROUND

In recent years, miniaturization of sensors has made a wider set of locations available for placement of these sensors. However, some locations include high temperatures and/or other harsh conditions that can damage the sensors.

One environment that benefits from sensors to monitor the environment is a gas turbine. Gas turbines typically include a turbine casing disposed about hot gas components, with a cowl disposed about the casing. Many turbines include an annular cavity between the casing and the cowl, with turbine components disposed within the annular cavity. Hot fluids flowing within the turbine may radiate heat to the annular cavity and cause turbine components to reach undesirable temperatures. Areas of abnormally high temperature near turbine components can degrade the components more quickly and reduce the operating lifetime of the components.

As such, there is a need for sensors able to withstand higher temperatures across the aerospace, power, transportation, and medical industries. Additionally, there is a need for methods to manage such sensors in high temperature environments.

Figure 1:
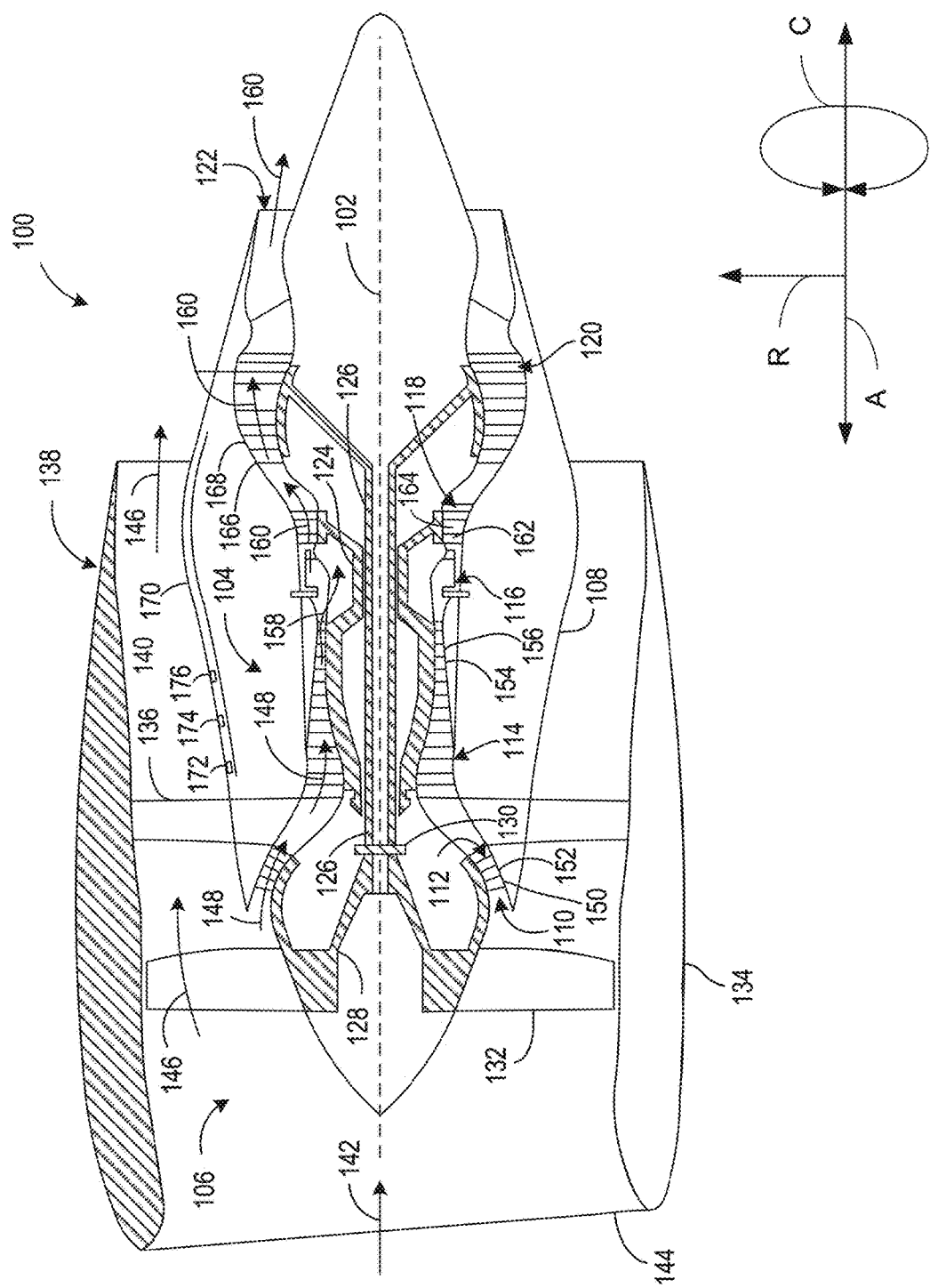
FIG. 1 is a cross-sectional view of an example turbofan gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.).

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Aircrafts include engines, which act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

The area under a cowling in a gas turbine engine is normally exposed to significant heat. Accordingly, the components of gas turbine engines are designed to withstand such normal operating temperatures. However, certain anomalies (e.g., an engine leak) can cause engine components to exceed normal operating temperatures. Abnormal engine temperatures can damage under-cowl components. Thus, discovering and addressing such anomalies is an important part of operating a gas turbine engine.

The traditional method of discovering anomalies in the under-cowl environment is a lengthy, inefficient, and often insufficient process. First, in response to a thermocouple detecting excessive temperature in an engine, the engine is shut down. Next, any casing covering an under-cowl area is removed to expose the under-cowl area. A safety operator then sprays heat sensitive materials on areas of suspected leakage. The engine is next re-started and taken to normal operational temperatures. After shutting down the engine and allowing the engine to cool, the under-cowl area is opened again. The safety operator then re-inspects the heat sensitive materials. By analyzing these materials, the safety operator can determine if they have found the leak. If they did not find the leak, the process repeats. This trial-and-error approach is time consuming and costly, often resulting in missed leaks or significant downtime while a leak is located.

An alternative approach uses multiple fixed infrared (IR) cameras to monitor the under-cowl area. Fixed IR cameras can generate a first image set by capturing images of an engine operating under normal conditions. The first image set can be compared to images of the same engine under different operating conditions. For example, the fixed IR cameras can capture additional images, generating a second image set. Then, the second image set can be directly compared to the first image set to identify anomalies. An image comparison may be carried out by safety personnel. Alternatively, various computer-based comparison methods can be used to compare image sets. By identifying differences between the image sets, anomalies can be detected and corrective measures can be taken.

Methods including fixed IR cameras and direct image comparison improve upon traditional anomaly detection methods, but still have significant shortcomings. Direct programmatic comparison (e.g., a pixel by pixel comparison) can generally only be effectively carried out when the first and second image sets overlap. As the area of coverage increases, storing enough images of normal operation becomes infeasible. Additionally, any slight change in the environment (even one unrelated to a thermal anomaly) can cause a false positive result.

This inflexibility reduces the effectiveness of IR camera arrays in the under-cowl environment. Furthermore, massive datasets and computationally complex comparison algorithms may involve significant computing power and time to execute. Various methods have been proposed to overcome these shortcomings. However, there has not yet been a system to efficiently facilitate autonomous detection of leaks across distributed infrared camera sources. Examples described herein use artificial intelligence (AI) camera control systems to generate substantially real-time engine surface temperature maps and automatically identify anomalies.

In some examples, this is achieved by first training a vector quantized variational autoencoder on a baseline infrared image set including multiple color channels supplemented with emissivity data generated from the baseline image set. The trained vector quantized variational encoder can be used to create a reconstructed image set from any image set (e.g., a baseline image set). A thermal anomaly may be detected if a ratio of the baseline image set to the reconstructed image set is above a threshold. In response, a communication can be transmitted to a safety system. In some examples, the safety system can initiate a notification and/or initiate corrective action.

Furthermore, such thermal anomaly detection could benefit any system seeking to monitor and/or prevent excessive temperatures. Example use cases can be found across the aerospace, power, transportation, and medical industries.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (e.g., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the annular inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and IR cameras 172-176. The operation of the IR cameras 172-176 to detect thermal anomalies will be described in detail in association with FIGS. 2-13.

Figure 2:
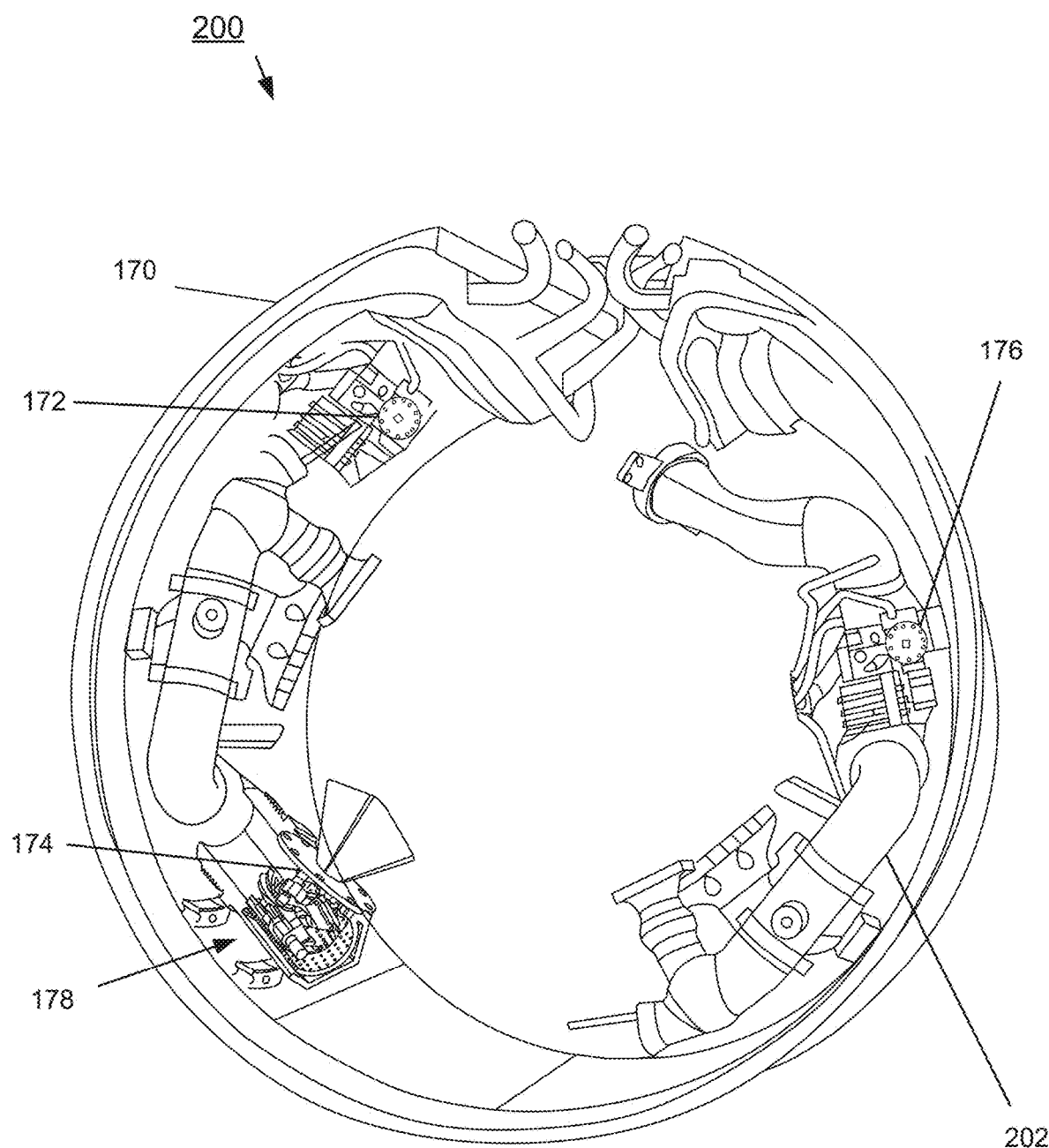
FIG. 2 is an illustration of an example autonomous sensor array that may be part of an example system to detect thermal anomalies.

FIG. 2 is an illustration of an example system to detect thermal anomalies. FIG. 2 includes an operating environment 200 and under-cowl components 202. FIG. 2 also shows the IR cameras 172-176, which in some examples coordinate to detect thermal anomalies. FIG. 2 also includes an example offset-arch gimbal 178.

The IR cameras 172-176 detect thermal energy emitted from the environment and convert the thermal energy into an electronic signal. The electronic signal can be monitored and analyzed with processor circuitry. Additionally, the IR cameras 172-176 are disposed within offset-arch gimbals (e.g., the example offset-arch gimbal 178.) Offset-arch gimbals provide pan/tilt capabilities, increasing the area of coverage of the IR cameras 172-176.

To facilitate pan/tilt capabilities, the example offset-arch gimbal 178 includes two arched rack and pinions disposed orthogonally to each other. In operation, a gimbal body, a sensor platform, a sensor (e.g., IR camera 174), and any other coupled components are simultaneously tilted as a first pinion moves about a first arched rack. As the first arched rack follows a generally curved shape, movement about the rack simultaneously translates and rotates these elements. A second arched rack placed orthogonally to the first arched rack functions similarly. Translation of the IR camera 174 causes a focal point of the IR camera to move. By moving the focal point of the IR camera 174, an area of coverage can be increased while decreasing a window size associated with a sensor within an enclosure. In the example of FIG. 2, IR cameras 172 and 176 are also disposed in offset-arch gimbals.

The IR cameras 172-176 also include specialized circuitry and/or instructions to coordinate with other offset-arch gimbal systems to cover a larger area. In the operating environment 200, the IR camera 172, the IR camera 174, and the IR camera 176 can coordinate together to cover an under-cowl area and detect thermal anomalies and/or other anomalies. Thermal anomalies may be associated with any of the under-cowl components 202. In some examples, the IR cameras may be movable (e.g., coupled to an autonomous drone) to facilitate a greater area of coverage.

Figure 3:
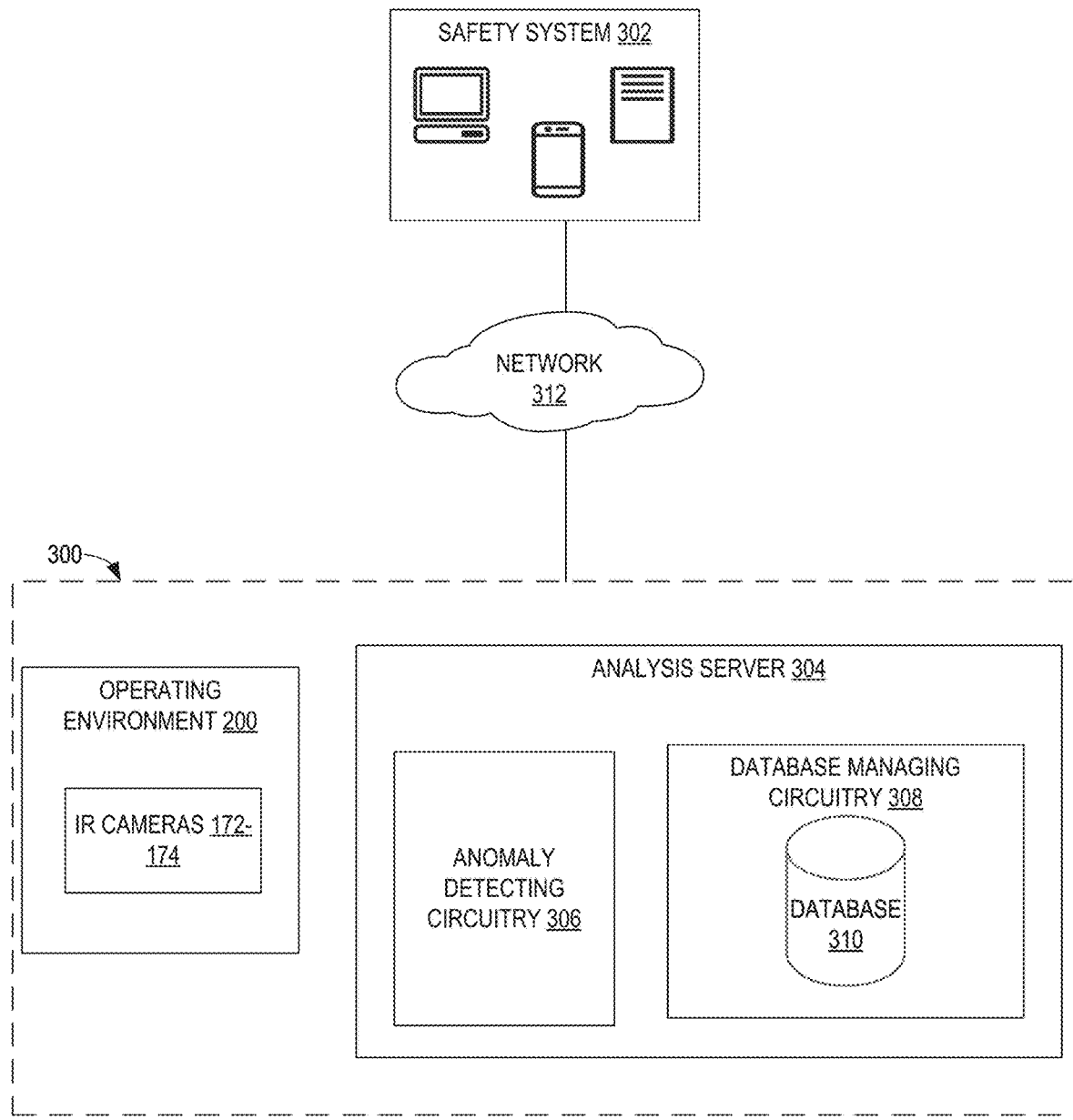
FIG. 3 is an illustration of the example system to detect thermal anomalies.

FIG. 3 is an illustration of an example system 300 to detect thermal anomalies. The system 300 includes an example analysis server 304 and the operating environment 200 of FIG. 2. The system 300 is additionally connected to a safety system 302 via a network 312.

The example analysis server 304 further includes example anomaly detecting circuitry 306, example database managing circuitry 308, and an example database 310. Although the analysis server 304 is illustrated separately from the operating environment 200, the analysis server 304 may instead be part of the operating environment 200. For example, the analysis server 304 may be included in a small computing device within the operating environment 200 (e.g., a microcontroller) or may be directly integrated into the circuitry of the example IR cameras 172-176.

To store images from the IR cameras 172-176 and/or other data for detecting thermal anomalies, the analysis server 304 further includes the database managing circuitry 308 and the database 310. The database managing circuitry 308 accesses the database 310 to store and/or retrieve information. The example database 310 stores thermal images, emissivity data, weights for artificial intelligence circuitry 406 discussed below in connection with FIG. 4, camera operation statistics, etc.

In some examples, when the system 300 detects a thermal anomaly, the system 300 sends a communication to the safety system 302. In some examples, the communication may cause the safety system 302 to generate a visual, audio, and/or electronic alert (e.g., alert an aircraft operator). In some examples, the analysis server 304 may instead communicate with an outside server, a cloud server, a third party entity, etc. In some examples, the safety system 302 may store images and/or a recording of the anomaly for later analysis. Stored images and/or recordings of anomalies may additionally or alternatively be sent to a safety operator.

Figure 4:
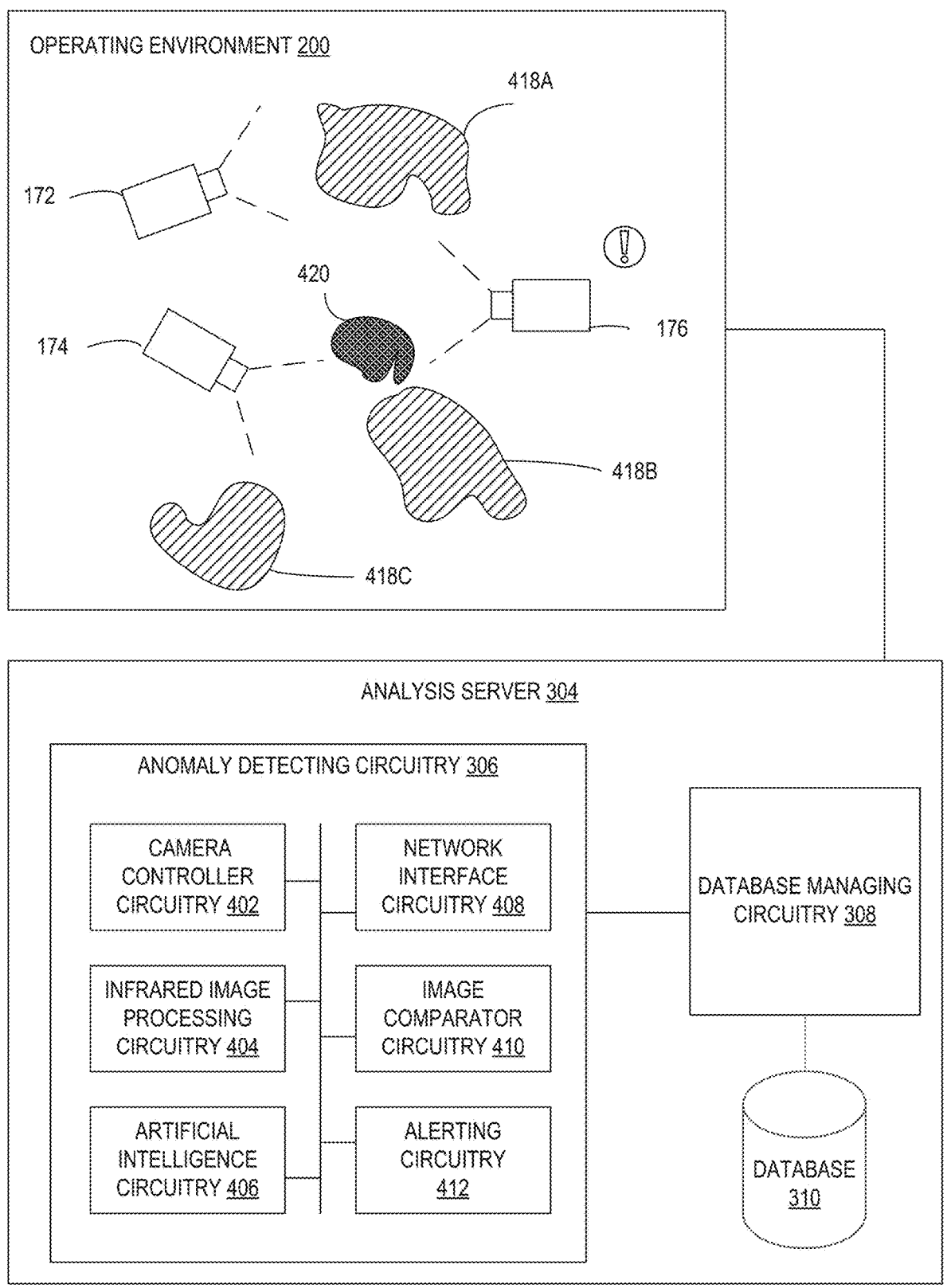
FIG. 4 is another illustration of the example system to detect thermal anomalies.

FIG. 4 is another illustration of the example system 300 to detect thermal anomalies. FIG. 4 illustrates the analysis server 304 of FIG. 3 in greater detail. Specifically, the anomaly detecting circuitry 306 includes example camera controller circuitry 402, example infrared image processing circuitry 404, example artificial intelligence circuitry 406, example network interface circuitry 408, example image comparator circuitry 410 and example alerting circuitry 412.

FIG. 4 provides an alternate illustration of the operating environment 200. The operating environment 200 includes normal thermal areas 418A-C as well as a thermal anomaly 420. In this illustration, the IR cameras 172-176 can be seen coordinating to detect the thermal anomaly 420.

The example infrared cameras 172-176 are controlled by the example camera controller circuitry 402. The camera controller circuitry 402 can detect leaks and track them across distributed IR-camera sources. The camera controller circuitry 402 may use AI camera control techniques to capture images for use in generation of a substantially real-time engine surface temperature tracking map. By using a two dimensional temperature map created by the artificial intelligence circuitry 406, the camera controller circuitry 402 can coordinate the IR cameras 172-176 to focus on areas with potential thermal anomalies. In the example of FIG. 4, IR camera 176 has detected the thermal anomaly 420. In some examples, in response to detecting the thermal anomaly 420, the camera controller circuitry 402 can direct a second IR camera (e.g., IR camera 174) to confirm the thermal anomaly 420. In some examples, in response to the IR camera 176 detecting the thermal anomaly 420, the camera controller circuitry 402 may direct at least one of the IR cameras 172-176 to scan the thermal anomaly 420 to determine a boundary (e.g., a border) of the thermal anomaly 420.

IR cameras 172-176 take in infrared rays irradiated from the area of coverage and convert the infrared rays into images for use by the infrared image processing circuitry 404. The example infrared image processing circuitry may perform a preprocessing on an infrared image to de-noise the infrared image. The infrared image processing circuitry 404 can additionally split an image into multiple color channels for use by the artificial intelligence circuitry 406.

In some examples, the IR cameras 172-176 are supplemented by additional RGB (e.g., visible imaging) cameras. The infrared image processing circuitry 404 can then generate emissivity data from captured images if there are more than two wavelengths detected. For example, a visible image and an infrared camera image can be used to determine emissivity based on multi-color pyrometry.

Infrared images and emissivity data can be provided to the example artificial intelligence circuitry 406. The example artificial intelligence circuitry 406 includes a vector quantized variational autoencoder (VQVAE). The VQVAE is a deep learning based generative AI method that finds an underlying (e.g., latent) representation for a given set of raw data.

For example, the artificial intelligence circuitry 406 can find an underlying representation for a normal thermal image set. Identification of the underlying representation is done with a neural network of two parts, an encoder network and a decoder network. The encoder and decoder are connected through a lower dimensional space that serves as a bottleneck. The bottleneck prompts the VQVAE to find a reduced set of features (e.g., underlying representation) of the normal thermal images. By training the neural network on a set of images at normal operating temperatures, the neural network can find an underlying data distribution within the normal images. After training, if an image with a thermal anomaly is provided to the VQVAE as input, the VQVAE output image will be significantly different from the input. The difference can be used to determine a presence of a thermal anomaly. Additionally, the neural network training may include data and/or captured images from more than one engine (e.g., a fleet of engines), which may further improve accuracy.

In some examples, the artificial intelligence circuitry 406 includes supervised and/or unsupervised machine learning models. For example, the artificial intelligence circuitry 406 may be based on a logistic regression model, which classifies an input as either a thermal anomaly or a normal image. In some examples, the artificial intelligence circuitry 406 includes a generative adversarial network. The artificial intelligence circuitry 406 may also include more than one artificial intelligence model (e.g., a vector quantized variational autoencoder and a generative adversarial network).

The example network interface circuitry 408 connects the analysis server 304 to the database managing circuitry 308 and the operating environment 200, and provides connectivity to other networked system(s) (e.g., the safety system 302). The image comparator circuitry 410 determines a difference between two images. In some examples, the image comparator circuitry 410 determines a ratio between an input to the AI circuitry 406 and an output of the AI circuitry 406.

In some examples, the difference may be based on an absolute value of a difference between corresponding pixel values. In some examples, the difference is determined based on a ratio of a first image to a second image. For example, a ratio value greater than one and less than 2 may indicate an anomaly. In any of the preceding examples, a neighboring area estimation can be used to reduce the effect of noise on an output and reduce false positives. The neighboring area estimation determines a second difference between an area including a potential anomaly and an area surrounding the potential anomaly, generating an alert when the second difference is larger than a threshold value.

If a difference is greater than a predefined threshold, the example alerting circuitry 412 can send a communication through the network interface circuitry 408 to the safety system 302 of FIG. 3. Alternatively, the database managing circuitry 308 may store a result. The database managing circuitry 308 may additionally store thermal images, emissivity data, weights for the AI circuitry 406, and/or camera operation statistics.

Figure 5A:
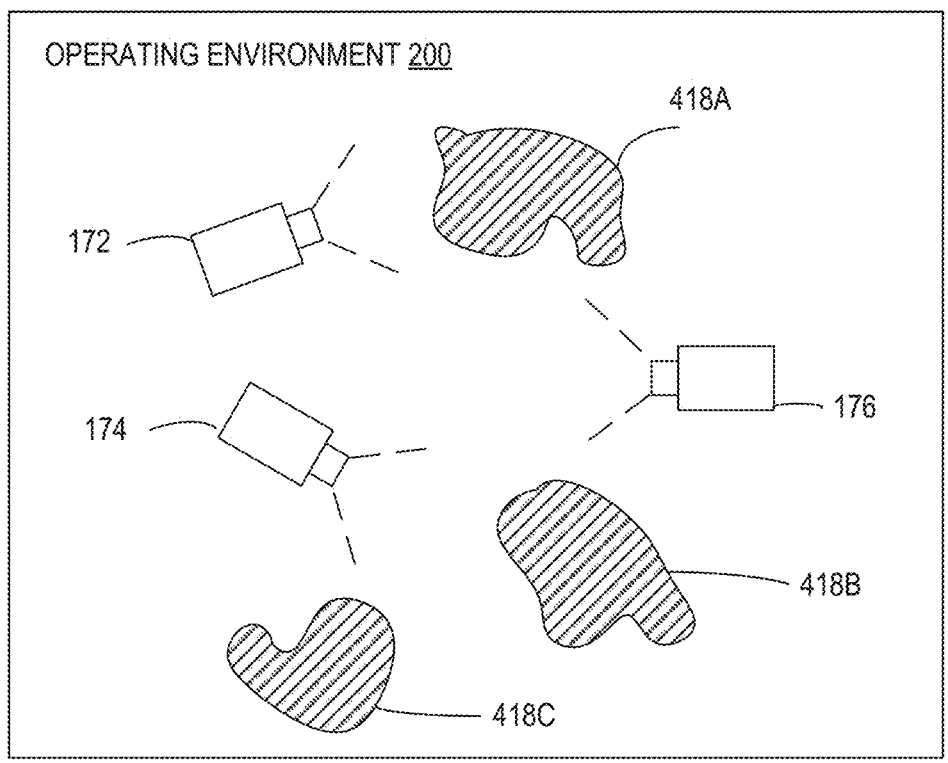
FIG. 5A illustrates an example operating environment without a thermal anomaly.

FIG. 5A illustrates the example operating environment 200 without a thermal anomaly. In this example, the IR cameras 172-176 are operating according to a routine defined by the camera controller circuitry 402 of FIG. 4. In this example, IR cameras 172, 174, and 176 each image a separate area. In some examples, an imaging routine may be based on a heat map, areas of prior anomalies, and/or an area of high importance.

Figure 5B:
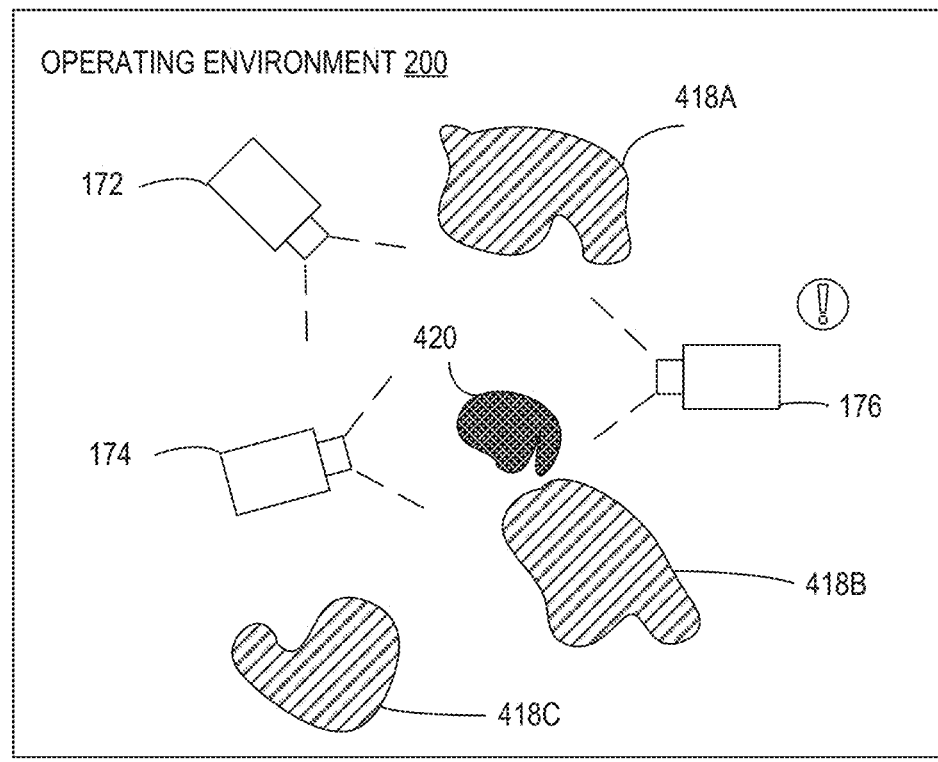
FIG. 5B illustrates an example operating environment with a thermal anomaly.

FIG. 5B illustrates an example operating environment 200 with the thermal anomaly 420. In this illustration, the IR camera 176 has detected the thermal anomaly 420. In response, the IR cameras 172 and 174 have deviated from their normal imaging routine in order to analyze the thermal anomaly 420. In the example illustration of FIG. 5B, the IR cameras 172 and 174 confirm the presence of the thermal anomaly 420. In some examples, one of the plurality of IR cameras 172-176 may detect the example thermal anomaly 420 based on a first captured image, and a second one of the plurality of IR cameras may receive instructions to capture a second image of the thermal anomaly 420. In such an example, if the second IR camera does not detect an anomaly, the result may be classified as a false positive.

If no thermal anomaly is detected, IR cameras 172-176 may operate in a normal imaging mode. In the normal imaging mode, the IR cameras 172-176 may follow a predefined routine based on a specific area of coverage.

For example, in the normal imaging mode, the camera controller circuitry 402 may operate the IR cameras 172-176 to generally image an area of coverage in a left-to-right, top-to-bottom manner. In some examples, the camera controller circuitry 402 can follow a pre-defined pattern/imaging routine which is stored in the database 310 and retrieved by the database managing circuitry 308.

In response to detection of an anomaly, the camera controller circuitry 402 may enter an anomaly analysis mode. In the anomaly analysis mode, the IR cameras 172-176 can deviate from the normal imaging routine to analyze the anomaly (e.g., the thermal anomaly 420.) In the anomaly analysis mode, the camera controller circuitry 402 may receive a location of the thermal anomaly 420, for example. In response, the camera controller circuitry 402 can direct the IR cameras 172-176 to the location of the thermal anomaly 420.

Figure 6:
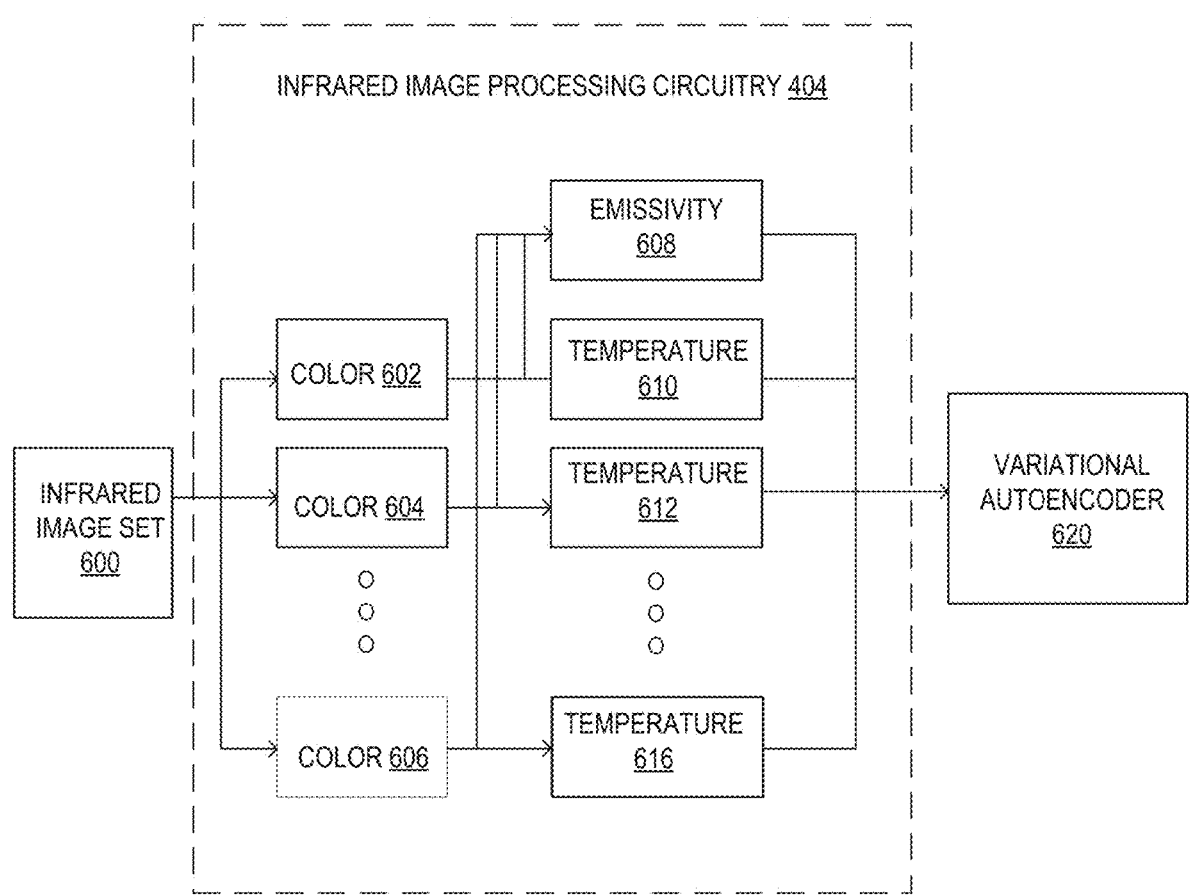
FIG. 6 illustrates example infrared images being operated on and transmitted as input to a trained vector quantized variational autoencoder.

FIG. 6 illustrates example infrared images being operated on and transmitted as input to a trained VQVAE. FIG. 6 includes an example infrared image set 600, an example first color 602, an example second color 604, an example third color 606, an example emissivity 608, an example first temperature 610, an example second temperature 612, an example third temperature 616, and an example variational autoencoder input 620.

The example infrared image set 600 goes through a series of operations by the infrared image processing circuitry 404 before being provided as input to the VQVAE. The elements of the infrared image set 600 are separated into colors 602-606. Although three colors are shown in the illustration of FIG. 6, there may be any number of colors at this stage of processing. Next, the colors 602-606 are converted to temperatures 608, 610, 612 and 616. Although four temperatures are shown in the illustration of FIG. 6, the colors 602-66 may be converted to any number of temperatures at this stage of processing. Infrared image sets such as the IR image set 600 may also be a monochrome as the image sensor does not distinguish wavelengths of visible light. Therefore, "color" as described herein may be any binary value that can be correlated to a temperature.

As described above in connection with FIG. 4, in some examples, the infrared image processing circuitry 404 leverages emissivity information to achieve improved thermal anomaly detection accuracy. In FIG. 6, pre-stored emissivity information is retrieved from a database. Information from captured images is then matched to the pre-stored emissivity information. For example, a machine learning based object recognition technique (e.g., a convolutional neural network) can be used to recognize an object type (e.g., pipe, flange, cable, etc.), and then extract emissivity from a database based on object type. In some examples, a visible image and an infrared camera image can be used to determine emissivity based on multi-color pyrometry. Inputs can be provided to the VQVAE 620 for training and/or generation of a reconstructed image.

Figure 7:
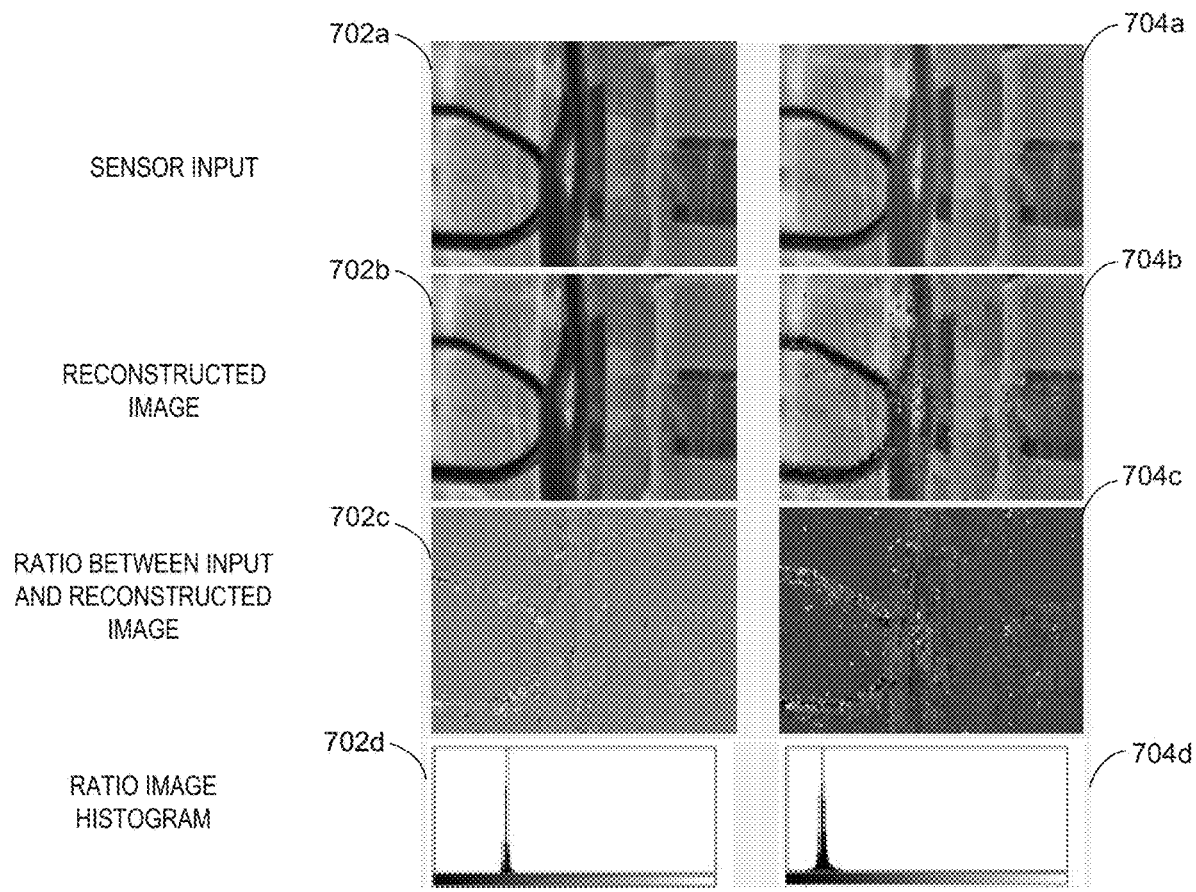
FIG. 7 illustrates example images from the example system to detect thermal anomalies.

FIG. 7 illustrates example images of the example system to detect thermal anomalies. FIG. 7 includes an example sensor input 702a, an example sensor input 704a, an example reconstructed image 702b, an example reconstructed image 704b, an example ratio image 702c, an example ratio image 704c, an example histogram 702d, and an example histogram 704d. The sensor input 702a is an image representative of an under-cowl environment during normal operating conditions, while the sensor input 704a is an image of substantially the same area at a second time, after a thermal anomaly has appeared. Although the sensor input 702a and the sensor input 704a are of the same area, the techniques described herein also are also effective on images of different areas and/or areas that have never before been imaged.

The reconstructed image 702*b* and the reconstructed image 704*b* illustrate output of the trained VQVAE 620 of FIG. 6. The reconstructed image 702*b* is relatively similar to the sensor input 702*a*. This is because the VQVAE 620 of FIG. 6 was trained (on normal thermal images) to minimize the difference between input and output images. Thus, as the sensor input 702*a* is an image of an area without an anomaly, the reconstructed image 702*b* has relatively fewer image artifacts. The reconstructed image 704*b*, on the other hand, shows relatively more distortion and/or artifacts in the image. In this example, this is because the area captured in the sensor input 704*a* includes a thermal anomaly. As the VQVAE 620 of FIG. 6 was not trained on images with thermal anomalies, the weights and biases of the underlying neural network do not function to create output with relatively fewer artifacts. The ratio image 702*c* illustrates the difference between the sensor input 702*a* and the reconstructed image 702*b*. The ratio image 704*c* illustrates the difference between the sensor input 704*a* and the reconstructed image 704*b*. As there is a greater ratio between the sensor input 704*a* and the reconstructed image 704*b*, a gaussian curve of the histogram 704*d* is relatively wider than that of the histogram 702*d*.

While an example manner of implementing the analysis server 304 FIG. 3 is illustrated in FIG. 4, one or more of the elements, processes, and/or devices illustrated in FIG. 4 may be combined, divided, re-arranged, omitted, eliminated, and/or implemented in any other way. Further, the example camera controller circuitry 402, the example infrared image processing circuitry 404, the example artificial intelligence circuitry 406, the example network interface circuitry 408, the example image comparator circuitry 410, the example alerting circuitry 412, the example database managing circuitry 308, and/or the example analysis server 304 of FIG. 3, may be implemented by hardware, software, firmware, and/or any combination of hardware, software, and/or firmware. Thus, for example, any of the example camera controller circuitry 402, the example infrared image processing circuitry 404, the example artificial intelligence circuitry 406, the example network interface circuitry 408, the example image comparator circuitry 410, the example alerting circuitry 412, the example database managing circuitry 308 and/or, more generally, the example analysis server 304 FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example camera controller circuitry 402, the example infrared image processing circuitry 404, the example artificial intelligence circuitry 406, the example network interface circuitry 408, the example image comparator circuitry 410, the example alerting circuitry 412, the example database managing circuitry 308 is/are hereby expressly defined to include a non-transitory computer readable storage device or storage disk such as a memory, a digital versatile disk (DVD), a compact disk (CD), a Blu-ray disk, etc., including the software and/or firmware. Further still, the example analysis server 304 of FIG. 3 may include one or more elements, processes, and/or devices in addition to, or instead of, those illustrated in FIG. 4, and/or may include more than one of any or all of the illustrated elements, processes and devices.

Figure 8:
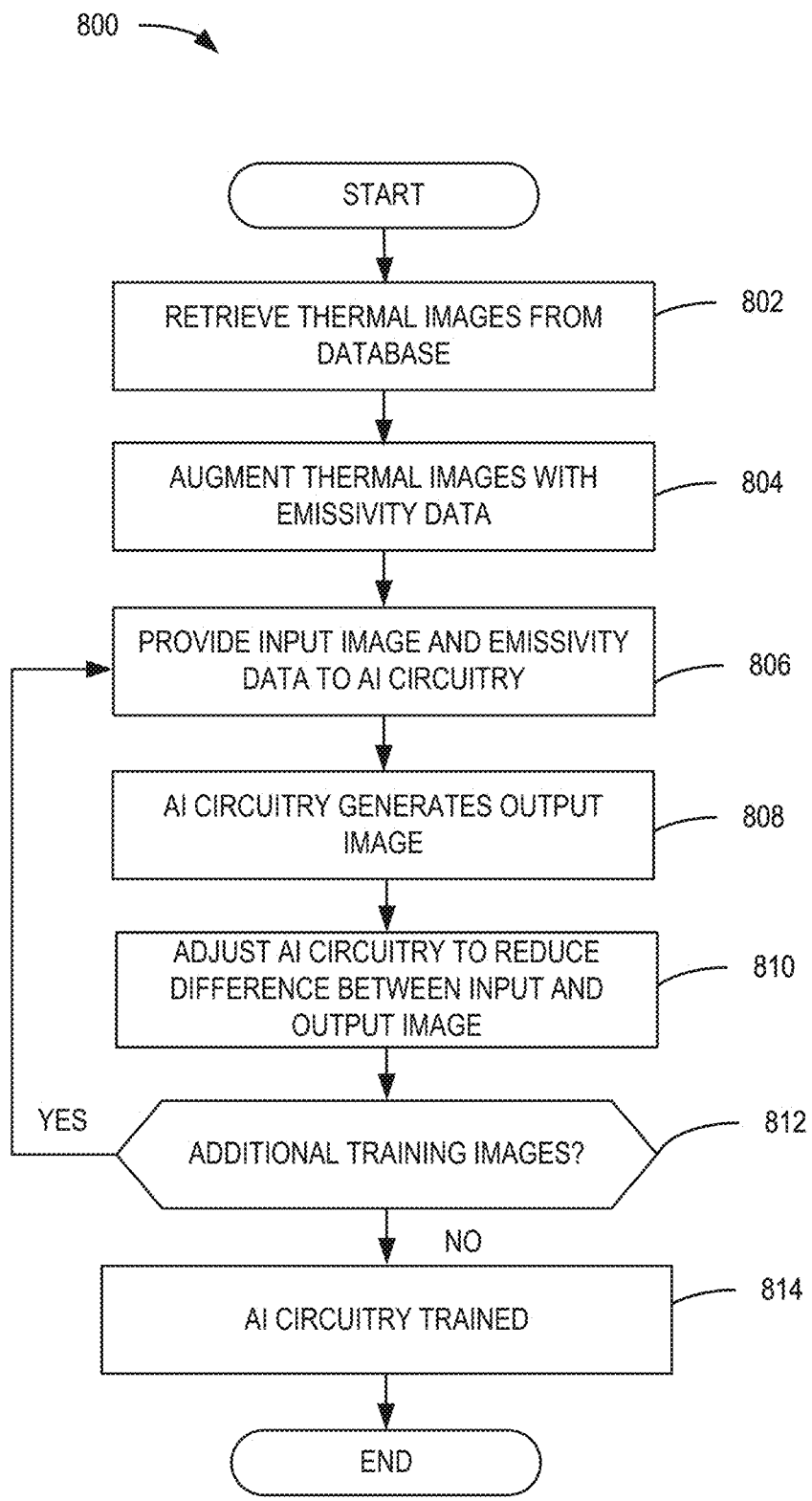
FIG. 8 is an illustration of representative of example machine readable instructions that may be executed by example processor circuitry to train the vector quantized variational autoencoder.
Figure 9:
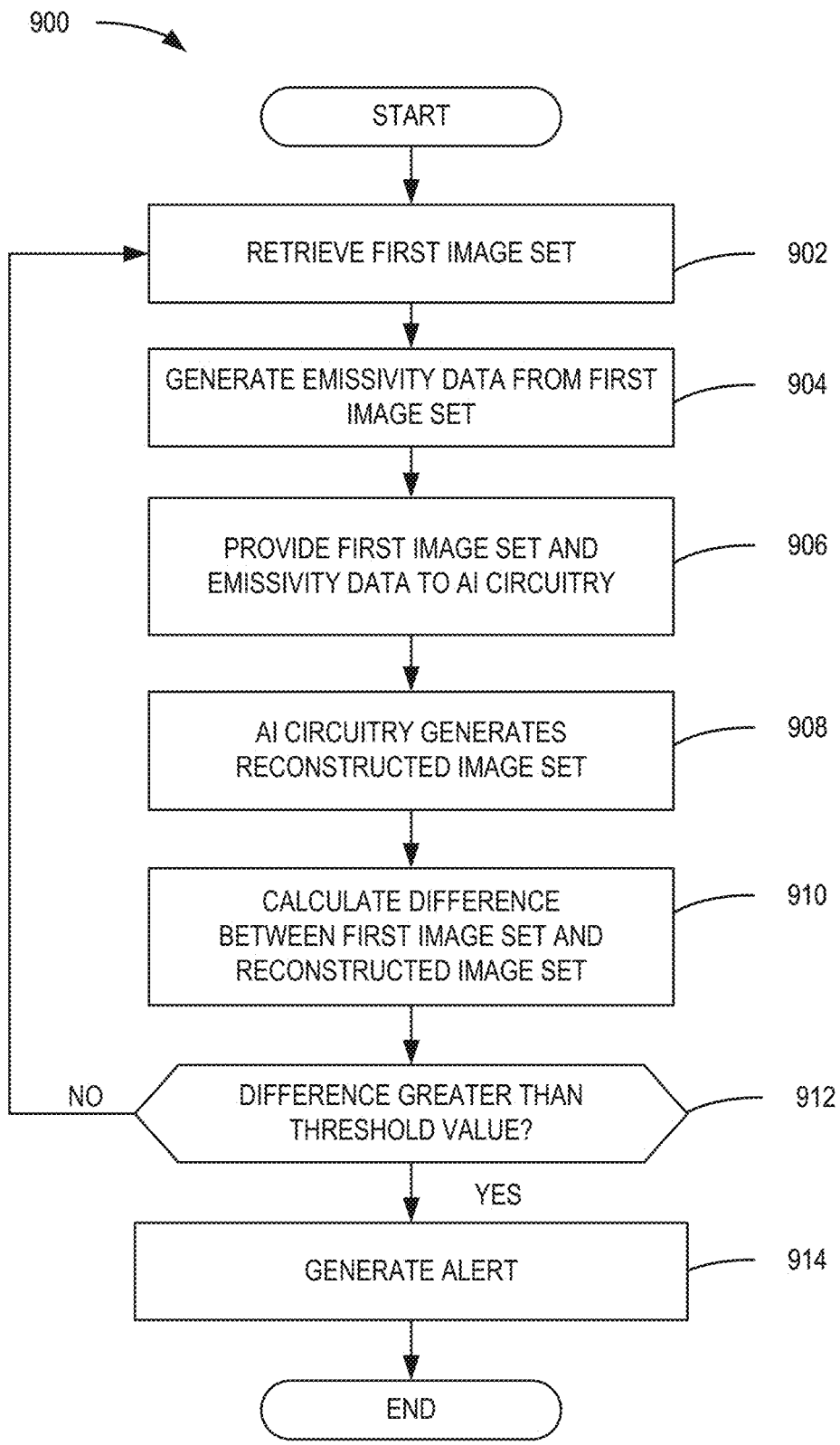
FIG. 9 is an illustration of representative of example machine readable instructions that may be executed by example processor circuitry to operate the vector quantized variational autoencoder.

A flowchart representative of example hardware logic circuitry, machine readable instructions, hardware implemented state machines, and/or any combination thereof for implementing the analysis server 304 of FIG. 3 is shown in FIGS. 8-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example analysis server 304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to train the artificial intelligence circuitry 406 (FIG. 4). The machine readable instructions and/or operations 800 of FIG. 8 begin at block 802, when the database managing circuitry 308 (FIG. 3) retrieves normal images from the database 310 (FIG. 3) to be used in training the artificial intelligence circuitry 406 (FIG. 4). At block 804, emissivity data from the database is paired to the thermal images that were retrieved at block 802. The thermal images are transmitted to the infrared image processing circuitry 404 (FIG. 4) to be augmented with emissivity data from the database 310 (FIG. 3). In some examples, objects included in the thermal images are detected. The detected objects are then matched to objects in the database 310 (FIG. 3) with pre-stored emissivity information. As described in association with FIG. 4, emissivity data can also be estimated from captured images if there are more than two wavelengths detected.

At block 806, input images and emissivity data are provided to the artificial intelligence circuitry 406 (FIG. 4). The artificial intelligence circuitry 406 (FIG. 4) next operates on the input at block 808 to generate a reconstructed image. For example, artificial intelligence circuitry 406 may include a VQVAE with multiple layers of neurons. As the input data (e.g., input images and emissivity data) is transferred through each layer, a series of operations (e.g., multiplications and additions) are performed on the data.

Additionally, the number of neurons in each layer initially decreases, which generates a compressed representation of the input data. As the data continues through the VQVAE, the data decompresses as the number of neurons in each layer increases. The output layer has a similar number of neurons as the original input, allowing a comparison between the output and input data.

At block 810, the image comparator circuitry 410 (FIG. 4) compares the reconstructed image to the input image, and the artificial intelligence circuitry 406 (FIG. 4) adjusts to lessen the difference between the input and output image. For example, the difference can be lessened by changing the weights and biases of layers of the VQVAE based on an error (e.g., difference between input and output images). In some examples, the difference is lessened based on stochastic gradient descent and backpropagation. At block 812, the artificial intelligence circuitry 406 (FIG. 4) determines whether additional training images are available. If so, training continues at block 806. Otherwise, control ends at block 814.

FIG. 9 is a flowchart representative of example machine readable instructions and/or example operations 900 that may be executed and/or instantiated by processor circuitry to operate a vector quantized variational autoencoder and/or artificial intelligence circuitry 406. The machine readable instructions and/or operations 900 of FIG. 9 begin at block 902, when the infrared image processing circuitry 404 (FIG. 4) preprocesses and retrieves a baseline image set from at least one infrared camera. In some examples, preprocessing may include image resizing to ensure all input images are of the same dimensions. In some examples, preprocessing may include introducing random perturbations to the images which can reduce plateaus in the training phase.

At block 904, emissivity data is estimated from captured images by the infrared image processing circuitry 404 (FIG. 4). For example, this estimation can be performed based on multi-color pyrometry. At block 906, the input image and emissivity data are provided to the artificial intelligence circuitry 406 (FIG. 4). The artificial intelligence circuitry 406 (FIG. 4) next operates on the input at block 908 to generate a reconstructed image set. As the input data (e.g., input images and emissivity data) are transferred through each layer, a series of operations (e.g., multiplications and additions) are performed on the data.

At block 910, the image comparator circuitry 410 (FIG. 4) calculates a ratio between the baseline image set and the reconstructed image set. For example, a ratio could be based on the difference between corresponding pixels (e.g., subtracting corresponding pixel values). At block 912, the alerting circuitry 412 (FIG. 4) determines if the ratio is above a threshold. If the ratio is not above the threshold, the process returns to block 902 where a new image set is retrieved.

If, at block 912, the ratio is above a threshold, the alerting circuitry 412 (FIG. 4) generates an alert at block 914. For example, the alert can be an entry in a log file for the maintenance or ground crew. In some examples, the alert can be a visible or audible alert for an aircraft pilot or other user. The example alert could be transmitted by display devices (e.g., to display logged operation information) or include activation of a light emitting diode (e.g., to display a warning signal).

Figure 10:
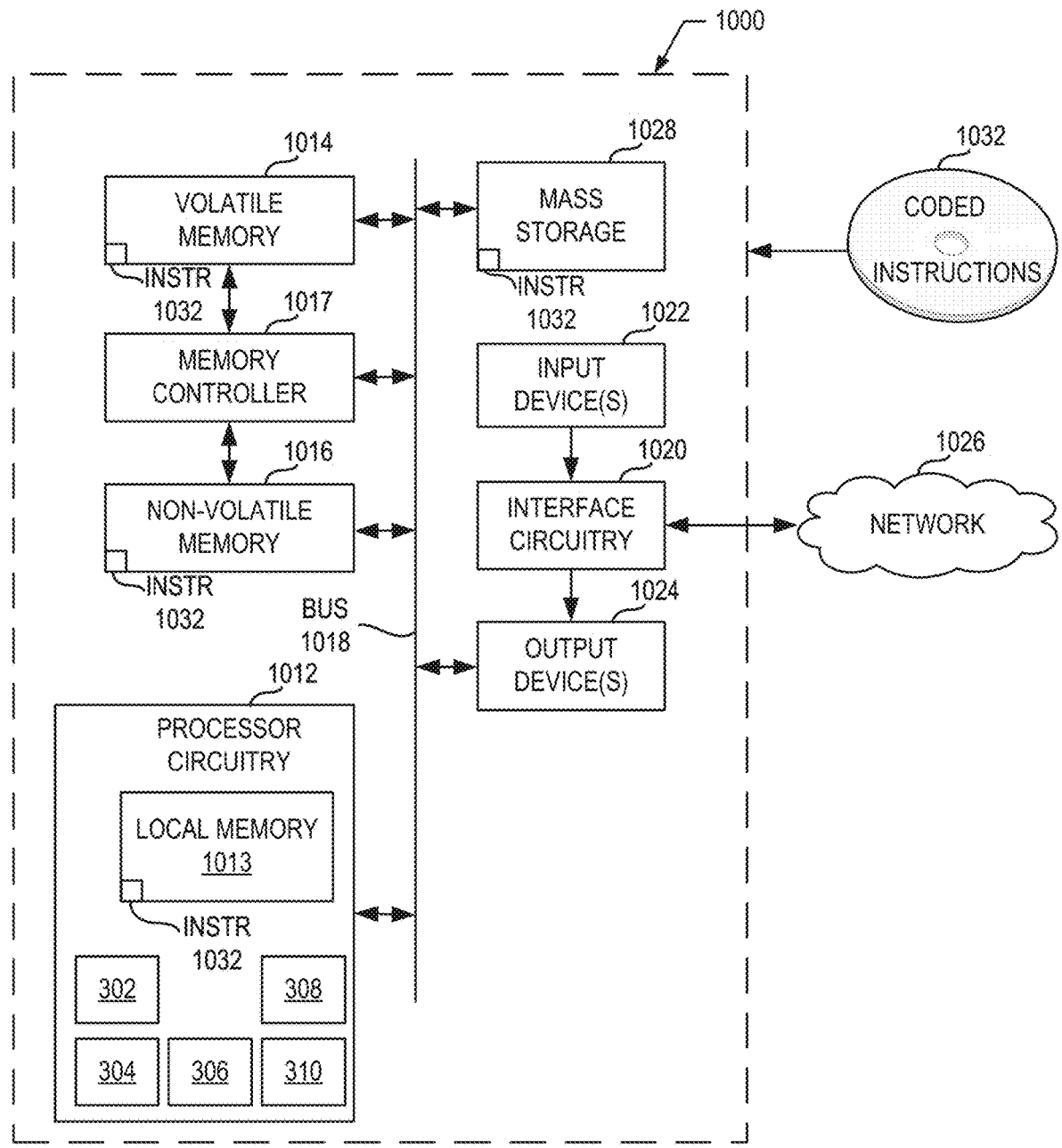
FIG. 10 is a block diagram of an example processing platform including processor circuitry structured to execute the example machine readable instructions of FIGS. 8-9 to implement the anomaly detecting system of FIG. 3.

FIG. 10 is a block diagram of an example processor platform 1000 structured to execute and/or instantiate the machine readable instructions and/or operations of FIGS. 8-9 to implement the analysis server 304 of FIG. 3. The processor platform 1000 can be, for example, a server, a processor, a custom circuit, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example camera controller circuitry 402 (FIG. 4), the example infrared image processing circuitry 404 (FIG. 4), the example artificial intelligence circuitry 406 (FIG. 4), the example network interface circuitry 408 (FIG. 4), the example image comparator circuitry 410 (FIG. 4), the example alerting circuitry 412 (FIG. 4), and the example database managing circuitry 308 (FIG. 4).

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input device(s) 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, and/or a voice recognition system.

One or more output device(s) 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

Machine executable instructions 1032, which may be implemented by the machine readable instructions of FIGS. 8-9, may be stored in the mass storage device 1028, in the local memory 1013, in the volatile memory 1014, in the non-volatile memory 1016, and/or on a removable non-transitory computer readable storage medium such as a CD or DVD.

Figure 11:
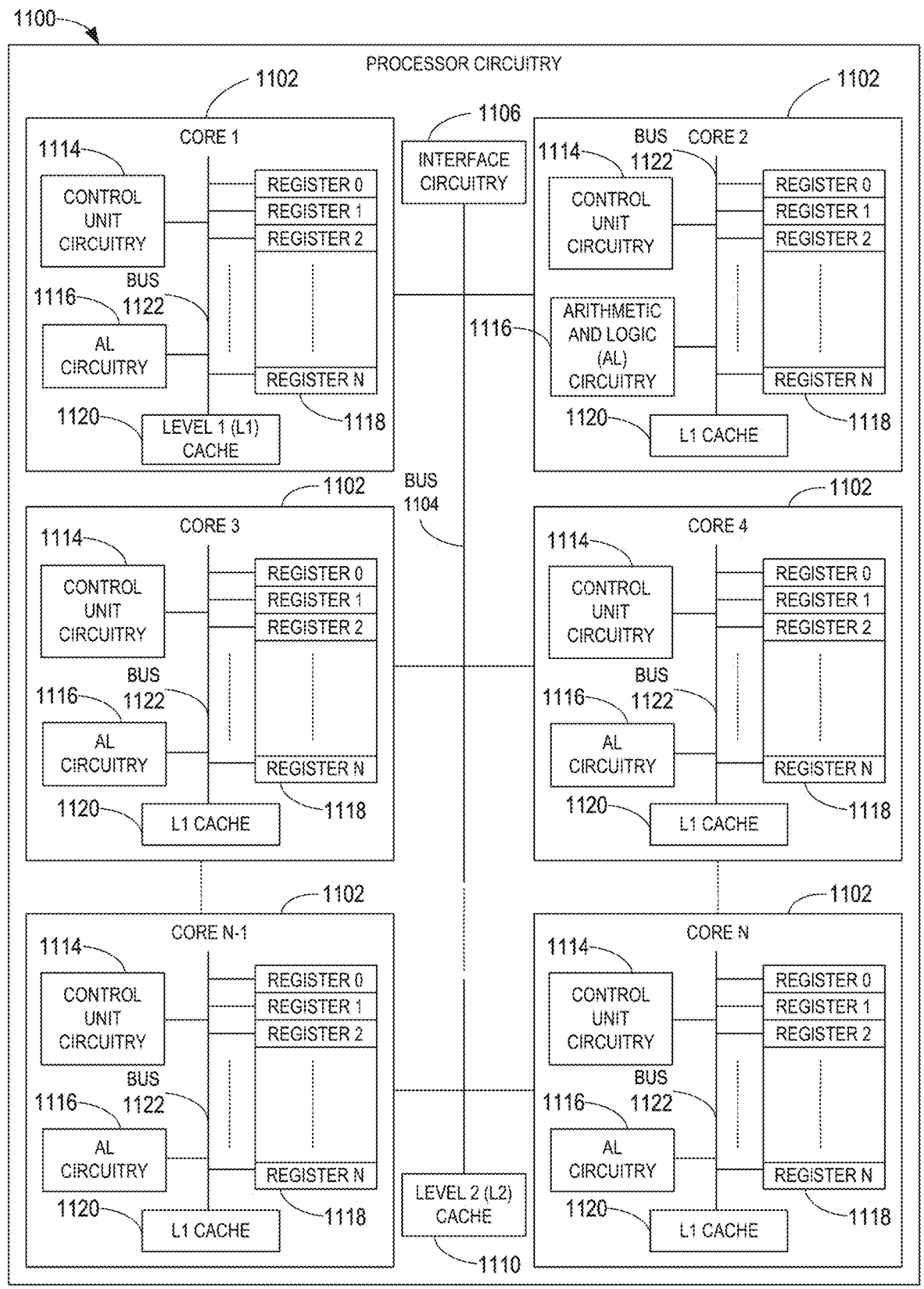
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIGS. 8-9.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an Arithmetic Logic Unit ALU) 1116, a plurality of registers 1118, the local memory (L1 cache) 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1122 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
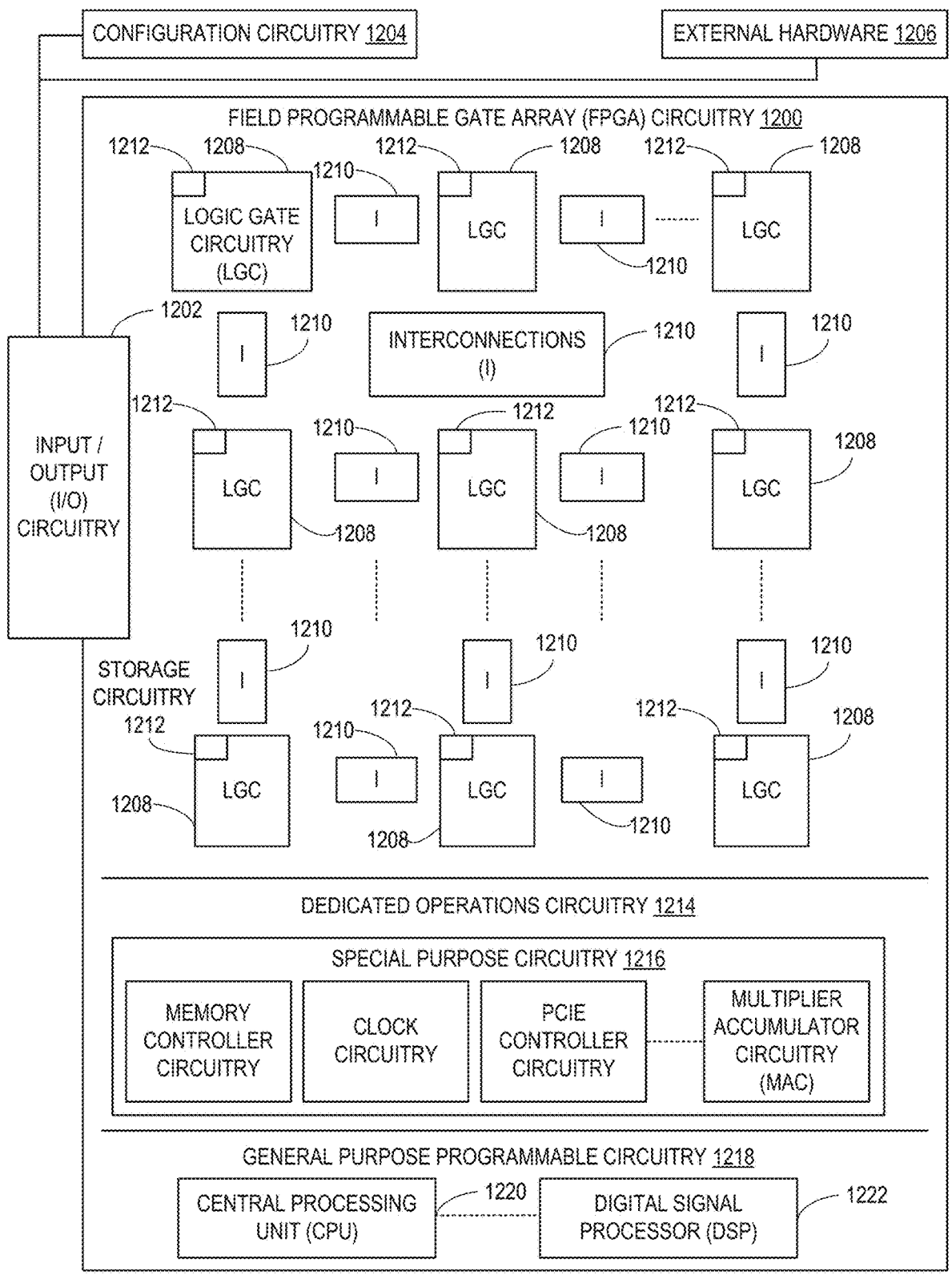
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 8-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 8-9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 8-9. As such, the FPGA circuitry 1200 may be structured to effectively instantiate some or all of the machine readable instructions of the flowcharts of FIGS. 8-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 8-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 8-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an onboard CPU, such as one or more of the example CPU 1220 of FIG. 12. Therefore, the processor circuitry 1000 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIGS. 8-9 may be executed by one or more of the cores 1102 of FIG. 11 and a second portion of the machine readable instructions represented by the flowcharts of FIGS. 8-9 may be executed by the FPGA circuitry 1200 of FIG. 12.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that facilitate autonomous detection of leaks across distributed infrared camera sources. The disclosed systems, methods, apparatus, and articles of manufacture improve the efficiency of detecting thermal anomalies in the under-cowl area of a gas turbine engine. In some examples, generating two-dimensional heat maps allows substantially real time anomaly detection by distributed sensors. Examples disclosed herein coordinate sensors more effectively, decreasing thermal anomaly testing time and increasing anomaly detection accuracy. Additionally, by providing both emissivity and image data to a variational autoencoder, the detection rate of thermal anomalies can be improved.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Further aspects of the present disclosure are provided by the subject matter of the following clauses:

An apparatus to detect engine anomalies comprising at least one memory to store instructions, and processor circuitry to execute the instructions to control a plurality of infrared cameras to capture a baseline image set, the baseline image set including at least two thermal images, generate emissivity data based on the baseline image set, provide the baseline image set and the emissivity data to an artificial intelligence model, the artificial intelligence model to generate a reconstructed image set, determine a difference between the baseline image set and the reconstructed image set, and in response to the difference exceeding a threshold, generate an alert indicating detection of an engine anomaly.

The apparatus of any preceding clause, wherein the artificial intelligence model includes at least one of a variational autoencoder and a generative adversarial neural network.

The apparatus of any preceding clause, wherein the difference is determined based on a ratio of a first image of the baseline image set to a second image of the reconstructed image set.

The apparatus of any preceding clause, wherein in response to a first camera of the plurality of infrared cameras detecting an anomaly, the processor circuitry is to execute the instructions to direct a second camera of the plurality of infrared cameras to image the anomaly.

The apparatus of any preceding clause, wherein to generate the emissivity data incudes at least one of associating a recognized object with an emissivity value stored in a database, and applying multi-color pyrometry to electromagnetic radiation of two different wavelength bands.

The apparatus of any preceding clause, wherein the processor circuitry is to execute the instructions to generate a two-dimensional temperature map.

The apparatus of any preceding clause, wherein the engine is a gas turbine engine and the anomaly is an engine leak in the under cowl area of the gas turbine engine.

A non-transitory computer readable medium comprising instructions, which, when executed, cause processor circuitry to at least control a plurality of infrared cameras to capture a baseline image set, the baseline image set including at least two thermal images, generate emissivity data based on the baseline image set, provide the baseline image set and the emissivity data to an artificial intelligence model, the artificial intelligence model to generate a reconstructed image set, determine a difference between the baseline image set and the reconstructed image set, and in response to the difference exceeding a threshold, generate an alert indicating detection of an engine anomaly example 9 includes the non-transitory computer readable medium of example 8, wherein the unsupervised artificial intelligence model includes at least one of a variational autoencoder and a generative adversarial neural network.

The non-transitory computer readable medium of any preceding clause, wherein the difference is determined based on a ratio of a first image of the baseline image set to a second image of the reconstructed image set.

The non-transitory computer readable medium of any preceding clause, wherein in response to a first camera of the plurality of infrared cameras detecting an anomaly, the processor circuitry is to execute the instructions to direct a second camera of the plurality of infrared cameras to image the anomaly.

The non-transitory computer readable medium of any preceding clause, wherein to generate the emissivity data incudes at least one of associating a recognized object with an emissivity value stored in a database, and applying multi-color pyrometry to electromagnetic radiation of two different wavelength bands.

The non-transitory computer readable medium of any preceding clause, wherein the processor circuitry is to execute the instructions to generate a two-dimensional temperature map.

The non-transitory computer readable medium of any preceding clause, wherein the engine is a gas turbine engine and the anomaly is an engine leak in the under cowl area of the gas turbine engine.

A method comprising controlling a plurality of infrared cameras to capture a baseline image set, the baseline image set including at least two thermal images, generating emissivity data based on the baseline image set, providing the baseline image set and the emissivity data to an artificial intelligence model, the artificial intelligence model to generate a reconstructed image set, determining a difference between the baseline image set and the reconstructed image set, and in response to the difference exceeding a threshold, generating an alert indicating detection of an engine anomaly example 16 includes the method of example 15, wherein the artificial intelligence model includes at least one of a variational autoencoder and a generative adversarial neural network.

The method of any preceding clause, wherein determining the difference is based on a ratio of a first image of the baseline image set to a second image of the reconstructed image set.

The method of any preceding clause, wherein generating the emissivity data incudes at least one of associating a recognized object with an emissivity value stored in a database, and applying multi-color pyrometry to electromagnetic radiation of two different wavelength bands.

The method of any preceding clause, wherein the processor circuitry is to execute the instructions to generate a two-dimensional temperature map.

The method of any preceding clause, wherein the engine is a gas turbine engine and the anomaly is an engine leak in the under cowl area of the gas turbine engine.

The following claims are hereby incorporated into this Detailed Description by this reference, with each claim standing on its own as a separate embodiment of the present disclosure.

What is claimed is:
1. An apparatus to detect engine anomalies comprising:
at least one memory to store instructions; and
processor circuitry to execute the instructions to:
    determine a difference between a baseline image set and a reconstructed image set based on:

a ratio of the baseline image set to the reconstructed image set; and a neighboring area estimation to identify an engine anomaly;

generate an alert indicating detection of the engine anomaly based on the difference between the baseline image set and the reconstructed image set; and generate a reconstructed image set using an artificial intelligence model to compare the reconstructed image set to the baseline image set.

2. The apparatus of claim 1, wherein the processor circuitry is to generate emissivity data based on the baseline image set using an association of a recognized object in the baseline image set with an emissivity value.

3. The apparatus of claim 1, wherein the processor circuitry is to generate emissivity data based on the baseline image set using an application of multi-color pyrometry to electromagnetic radiation of a wavelength band in the baseline image set.

4. The apparatus of claim 1, wherein the artificial intelligence model is to apply stochastic gradient descent and backpropagation to adjust the difference between the reconstructed image set and the baseline image set.

5. The apparatus of claim 1, wherein the baseline image includes at least two thermal images.

6. The apparatus of claim 1, wherein in response to a first camera of a plurality of infrared cameras detecting the engine anomaly, the processor circuitry is to direct a second camera of the plurality of infrared cameras to image the engine anomaly.

7. A method comprising:
determining a difference between a baseline image set and a reconstructed image set based on:
a ratio of the baseline image set to the reconstructed image set; and
a neighboring area estimation to identify an engine anomaly;
generating an alert indicating detection of the engine anomaly based on the difference between the baseline image set and the reconstructed image set; and
generating a reconstructed image set using an artificial intelligence model to compare the reconstructed image set to the baseline image set.

8. The method of claim 7, further including generating emissivity data based on the baseline image set using an association of a recognized object in the baseline image set with an emissivity value.

9. The method of claim 7, further including generating emissivity data based on the baseline image set using an application of multi-color pyrometry to electromagnetic radiation of a wavelength band in the baseline image set.

10. The method of claim 7, wherein the artificial intelligence model is to apply stochastic gradient descent and backpropagation to adjust the difference between the reconstructed image set and the baseline image set.

11. The method of claim 7, wherein the baseline image includes at least two thermal images.

12. The method of claim 7, wherein in response to a first camera of a plurality of infrared cameras detecting the engine anomaly, further including directing a second camera of the plurality of infrared cameras to image the engine anomaly.

13. A non-transitory computer readable medium comprising instructions, which, when executed, cause processor circuitry to at least:
determine a difference between a baseline image set and a reconstructed image set based on:
a ratio of the baseline image set to the reconstructed image set; and
a neighboring area estimation to identify an engine anomaly;
generate an alert indicating detection of the engine anomaly based on the difference between the baseline image set and the reconstructed image set; and
generate a reconstructed image set using an artificial intelligence model to compare the reconstructed image set to the baseline image set.

14. The non-transitory computer readable medium of claim 13, wherein the processor circuitry is to generate emissivity data based on the baseline image set using an association of a recognized object in the baseline image set with an emissivity value.

15. The non-transitory computer readable medium of claim 13, wherein the processor circuitry is to generate emissivity data based on the baseline image set using an application of multi-color pyrometry to electromagnetic radiation of a wavelength band in the baseline image set.

16. The non-transitory computer readable medium of claim 13, wherein the artificial intelligence model is to apply stochastic gradient descent and backpropagation to adjust the difference between the reconstructed image set and the baseline image set.

17. The non-transitory computer readable medium of claim 13, wherein the baseline image includes at least two thermal images.

* * * * *